March 13, 1934. C. G. OLSON Re. 19,116

LOCK WASHER AND METHOD OF MAKING SAME

Original Filed July 31, 1930

Inventor:
Carl G. Olson
By Cleaver, Cox & Moore
Atty's

Reissued Mar. 13, 1934 Re. 19,116

UNITED STATES PATENT OFFICE 19,116

LOCK WASHER AND METHOD OF MAKING SAME

Carl G. Olson, Chicago, Ill., assignor to Shakeproof Lock Washer Company, Chicago, Ill., a corporation of Delaware Original No. 1,865,132, dated June 28, 1932, Serial No. 491,975, July 31, 1930. Application for reissue January 25, 1934, Serial No. 708,336

11 Claims. (Cl. 10—86)

My invention relates generally to lock washers and methods of making same, and more particularly to lock washers of the conical type made from sheet spring stock and to methods of making such washers.

When a lock washer of the conical type is clamped between the surface of a conical screw head and the companion conical surface of a work piece, the outer margin of the washer terminates immediately adjacent the outer margin of the screw head. Thus the outer margin of the washer is continuously subjected to the possibility of interference from the sharp end of a screw driver. In other words, if the screw driver which is employed in tightening a screw head against a conical lock washer projects outwardly from the slot of the screw or slips out of said slot, the sharp end of the screw driver will be brought into direct engagement with the washer in such a manner as to cause said margin to become distorted. In fact experience has shown that when conventional types of conical lock washers are employed wherein locking prongs are spaced along the outer margin thereof, these prongs are frequently broken as a result of the inadvertent engagement therewith by the screw driver when the screw is being tightened in position.

It is one of the primary objects of my present invention to provide a conical type of lock washer which is so constructed as to prevent the breakage of washer teeth, which has heretofore been experienced when screw drivers and the like have been inadvertently forced into engagement with conventional conical washers.

More specifically my invention contemplates the provision of a conical lock washer having a plurality of outer marginal prongs which are so arranged that the teeth in each pair of prongs are juxtapositioned, thereby preventing a screw driver or instrument of like nature from being forced downwardly between said teeth.

A still further object is to provide a conical lock washer as above set forth in which the adjacent teeth of companion prongs are not only positioned close together so as to prevent breakage resulting from screw drivers and the like, but which are provided with teeth of a substantially non-resilient nature so as to thereby increase the locking effectiveness of the washer.

A further object of my invention is to provide a conical washer as above set forth in which the adjacent locking edges of the prongs are closer together at the outer ends than at the roots.

A further object of my invention is to provide improved methods of making lock washers, and to this end I propose to form washers from flat spring stock and to produce an overlapping tooth construction by a novel and improved method. More specifically, the invention contemplates methods of producing lock washers having overlapping prongs wherein said overlapping is accomplished by reducing the original diameter of the washer.

Another object of the invention is to provide methods of producing washers having overlapping teeth without affecting the original consistency of the stock. In other words, I propose to provide washers of the pronged type having overlapping teeth, which teeth are of the original consistency of the stock from which the washer is produced.

These and numerous other objects and advantages will be more apparent from the following detailed description when considered in connection with the accompanying drawing, wherein Figure 1 is a perspective view of a conical lock washer constructed in accordance with the teachings of my invention;

Figure 5:
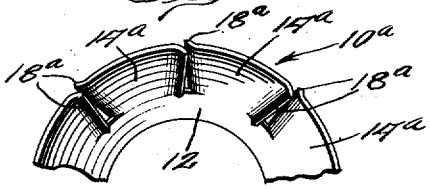
Figure 3:
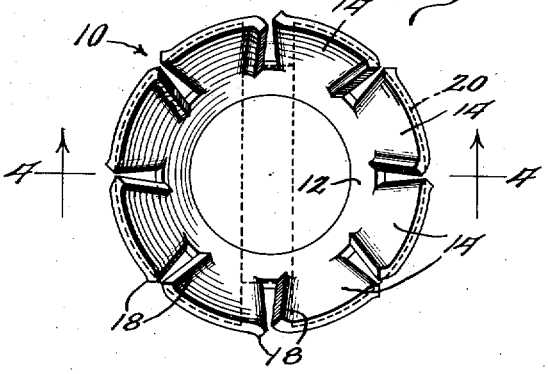
Figure 3 is a plan view of the washer shown in Figure 1 with a screw head associated therewith, said screw head being designated by dotted lines.
Figure 6:
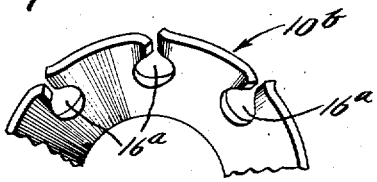

Figure 5 discloses a modified prong construction in which the adjacent edges of the prongs overlap; and Figure 6 is a still further modification disclosing the manner in which the prongs may be provided by forming a comparatively large circular opening in the roots thereof.

Figure 1:
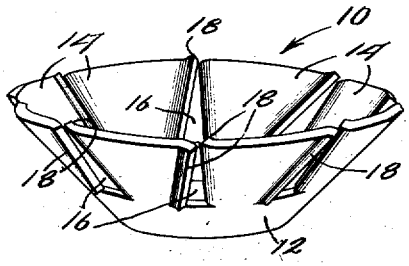

Referring now to the drawing more in detail, wherein like numerals have been employed to designate similar parts throughout the various figures, it will be seen that Figure 1 discloses a conical lock washer constructed in accordance with the teachings of my invention, and this washer is designated generally by the numeral 10. The washer 10 includes a lower annular body portion 12 and extending upwardly from the body portion 12 is a plurality of prongs 14. It will be noted that each of these prongs 14 is narrower at its root than at the outer extremity thereof.

Figure 2:
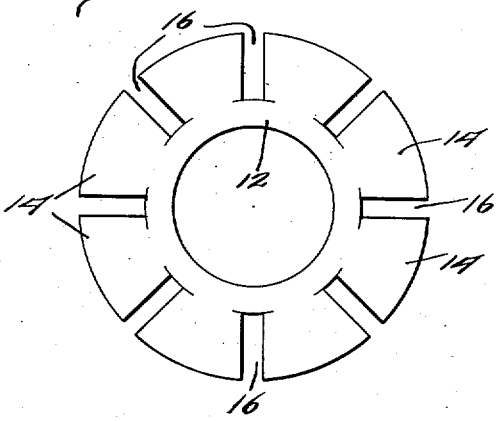
Figure 2 is a plan view of a blank from which the lock washer of Figure 1 is formed.

In order to more clearly understand the manner in which the prongs 14 are provided on the washer, attention is directed to Figure 2, wherein I have shown a blank stamped from a piece of sheet metal. This blank has already been provided with the prongs 14, and it will be seen that these prongs are separated by spaces or cut-outs 16. When the blank of Figure 2 is given a conical shape so as to present the device shown in Figure 1, the outer extremities of the prongs 14 will obviously be closer together than the lower extremities thereof.

Each of the prongs 14 is provided with oppositely disposed spurs or locking teeth 18, which extend along substantially the entire edge of each prong. Thus the teeth 14 present work engaging edges which are positioned out of the plane of the body portion of the prongs. These spurs or locking teeth 18 are provided by displacing each extremity of the prongs in opposite directions out of the plane of the prong stock. At this point it should be understood that the teeth or spurs 18 are substantially rigid,—that is to say, they are so constructed that when the conical surface of a screw 20 is brought to bear against the washer, the spurs or teeth 18 will present substantially rigid locking abutments as distinguished from resilient work engaging teeth of the conventional type of twisted tooth lock washer. The only resiliency which might be brought into play at the time the screw head is clamped against the washer is the resiliency of the section of the body portion 12 adjacent the slots or spaces 16. In other words, my invention contemplates the provision of a conical type washer having resilient prongs which are equipped with substantially rigid non-resilient spurs or locking teeth disposed on opposite sides thereof.

Figure 4:
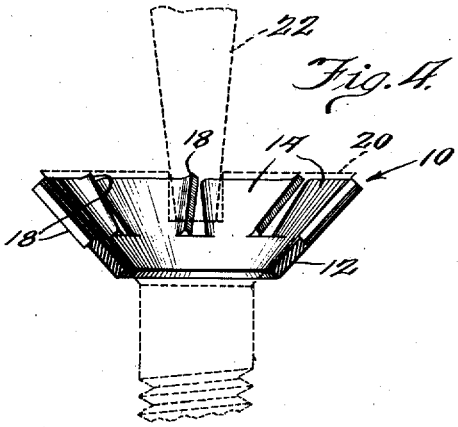
Figure 4 is a sectional view taken substantially along the line 4—4 of Figure 3 to more clearly disclose the manner in which my improved washer prevents a screw driver from being forced between the prongs of the washer.

It should also be noted that in forming my improved washer, the outer extremities of the adjacent prongs are positioned very close to each other so as to preclude the possibility of forcing the blade of a screw driver 22 (Figure 4) between the prongs. Obviously, if a screw driver blade is forced between the teeth and rotation imparted thereto, said teeth will ultimately be broken off or at least seriously disfigured.

In Figure 5 I have shown a conical lock washer $10^a$ having a plurality of prongs $14^a$. These prongs $14^a$ are provided with work engaging teeth $18^a$ which overlap each other. Thus when the washer is finally clamped in position against the work piece the teeth $18^a$ are forced against each other, thereby positively preventing the insertion of a tool such as the blade of a screw driver between the teeth. By this construction, the possibility of urging the teeth $18^a$ into the plane of the body portion of the prongs $14^a$ is positively precluded.

In Figure 6 a still further modification is disclosed, said figure showing a modified washer which I have designated generally by the numeral $10^b$. This washer differs from the other types shown in that a plurality of relatively wide apertures $16^a$ are provided which enable the outer extremities of the prongs to be adjacently positioned and at the same time permit said washer to be given a conical shape from a single piece of flat stock.

From the foregoing it will be apparent that my invention contemplates the provision of a conical type of lock washer having adjacently positioned work engaging teeth which are formed on opposite ends of outwardly extending radial prongs. These teeth are adjacently positioned so as to prevent the insertion therebetween of a turning element such as the blade of a screw driver, and furthermore these teeth are of a substantially non-resilient character. Thus these teeth provide a very firm or rigid locking abutment when clamped against the work piece. A conical washer of this type may be formed from a single piece of flat stock which is provided with a plurality of radial slots or cut-outs along the margin thereof, said slots being of such a width as to enable the outer portion of the prongs to be juxtapositioned when a conical shape has been imparted to the blank. In other words, the slots in the blank have parallel sides, and when said blank has been formed into a conical shape, these sides are tapered. It will also be noted that by having the outer extremities of the prongs adjacently positioned, a continuous upper washer edge or rim is presented as distinguished from washers of the type which have heretofore been employed, wherein spaces are presented between the washer prongs.

It might be stated that the prongs of my improved washer are resilient only in the sense that they are connected by resilient strips which form a part of the conical body portion 12. These strips being narrower than the narrowest section of the prongs will naturally bend when the washer is clamped in position. However, the prongs proper will not vary in shape. The spurs 18 are rigid to the extent that they will not be flattened by a screw head which is clamped thereagainst.

It will be apparent from the foregoing description that the overlapping prong construction shown in Figure 5 is produced by reducing the original diameter of the blank shown in Figure 2. The adjacent marginal portions of the prongs may first be warped in opposite directions, and then the diameter of the stock reduced so as to produce the overlapping effect shown in Figure 5. In practicing this method, the original consistency of the prongs $14^a$ is maintained. In other words, the uniform thickness of the stock is unaffected as a result of the step which produces the overlapping. This form of overlapping prong not only serves to effectively preclude the entrance of the screw driver 22 between the adjacent prongs as the screw is being turned, but also provides a firm locking abutment between the screw head and the work in which the screw is applied. This ratchet-like effect of the overlapping prongs provides an effective means for securing the screw against retrograde movement.

Having thus described my invention, what I claim as new and desire to secure by Letters Patent is:

1. A lock washer for conical head screws and the like comprising a substantially cone-shaped body, and a plurality of marginal prongs extending from the outer margin thereof, said prongs having work engaging teeth extending out of the plane thereof on opposite sides for lockingly engaging the work, the outer extremities of the companion teeth in said prongs being juxtapositioned whereby to present a substantially continuous margin of stock adjacent a screw head when said head is clamped thereagainst and thereby prevent the entrance of a screw driver and the like between said prongs.

2. A lock washer including a conical body portion of spring stock, and a plurality of prongs arranged in overlapping relation along at least one margin of said conical body, the overlapping of said prongs being sufficient to provide a firm abutment when a clamping surface is tightened thereagainst, said prongs being of substantially the original consistency of the stock.

3. A lock washer including a conical body portion of spring stock, and a plurality of prongs arranged in overlapping relation along the outer margin of said conical body, the overlapping of said prongs being sufficient to provide a firm abutment when a clamping surface is tightened thereagainst, said prongs being of substantially the original consistency of the stock.

4. A lock washer including an annular body portion of spring stock, a plurality of prongs arranged in overlapping relation along the outer margin of said body, said prongs being of substantially the original consistency of the stock.

5. A lock washer including an annular body portion of spring stock, said annular body having an unbroken continuity, a plurality of prongs arranged in overlapping relation along the outer margin of said body, said prongs being of substantially the original consistency of the stock.

6. The method of making lock washers which includes the steps of providing radial severances along the margin of spring stock to provide a plurality of prongs along an annular body, warping said prongs so as to present oppositely disposed work engaging edges on opposite sides of the body, circumferentially shifting adjacent radial margins of each prong so as to effect the overlapping of said margins without affecting the uniform thickness of the prongs during said shifting.

7. The method of making lock washers which includes the steps of providing radial severances along the outer margin of spring stock to provide a plurality of outer prongs along an annular body, warping said prongs so as to present oppositely disposed work engaging edges on opposite sides of the body, circumferentially shifting adjacent radial margins of each prong so as to effect the overlapping of said margins without affecting the uniform thickness of the prongs during said shifting.

8. The method of making lock washers which includes the step of forming a plurality of prongs on a margin of spring stock, warping said prongs to present work engaging edges on opposite sides of the washer body, maintaining the roots of said prongs within the zone of symmetry of the washer body, and causing adjacent margins of each pair of prongs to be disposed in overlapping relation while maintaining the body of each prong uniform in thickness.

9. The method of making lock washers which includes the step of producing an annular section of spring stock having a plurality of radial prongs along at least one margin thereof, and reducing the diameter of said annular section so as to effect the overlapping of adjacent margins of said prongs.

10. The method of making lock washers which includes the step of marginally severing a section of flat spring stock so as to form a plurality of annularly arranged radial prongs along the margins of an annular body, reducing the diameter of said body so as to effect the overlapping of adjacent margins of said prongs.

11. The method of making lock washers which includes the step of marginally and radially severing a section of spring stock so as to form a plurality of annularly arranged radial prongs, circumferentially shifting adjacent radial margins of said prongs to produce an overlapping relation without affecting the thickness of the prongs during said circumferential shifting.

CARL G. OLSON.